Jan. 13, 1925. 1,523,290

E. RIMAILHO

APPARATUS FOR THE MEASUREMENT OF HIGH PRESSURES

Filed March 2, 1921

Inventor

EMILE RIMAILHO by H. B. Willson & Co.

Attorneys

Patented Jan. 13, 1925.

1,523,290

UNITED STATES PATENT OFFICE.

EMILE RIMAILHO, OF PARIS, FRANCE.

APPARATUS FOR THE MEASUREMENT OF HIGH PRESSURES.

Application filed March 2, 1921. Serial No. 449,136.

*To all whom it may concern:*

Be it known that I, EMILE RIMAILHO, a citizen of the Republic of France, and residing at Paris, Seine Department, No. 12 Rue de la Rochefoucauld, in the Republic of France, have invented certain new and useful Improvements in Apparatus for the Measurement of High Pressures, of which the following is a specification.

This invention relates to an apparatus employed for the exact measurement of pressures of considerable value which may attain and even exceed 10,000 kilogrammes per square centimeter, such as are used for instance in the hydraulic hooping process for ordnance, in certain chemical industries, and the like. To this effect, the apparatus comprises a piston movable within a steel block, and the pressure to be measured which acts upon this piston is transmitted directly to a suitable number of crushers or test pieces interposed between a piston of suitable diameter and a bearing surface provided within the said block. To estimate the amount of pressure in such cases, measurement is made of the degree of crushing of the said crushers or the displacement of the piston, either directly or by the use of any suitable amplifying device.

The accompanying drawing shows by way of example two constructional forms of the apparatus according to this invention, wherein.

Figure 1:
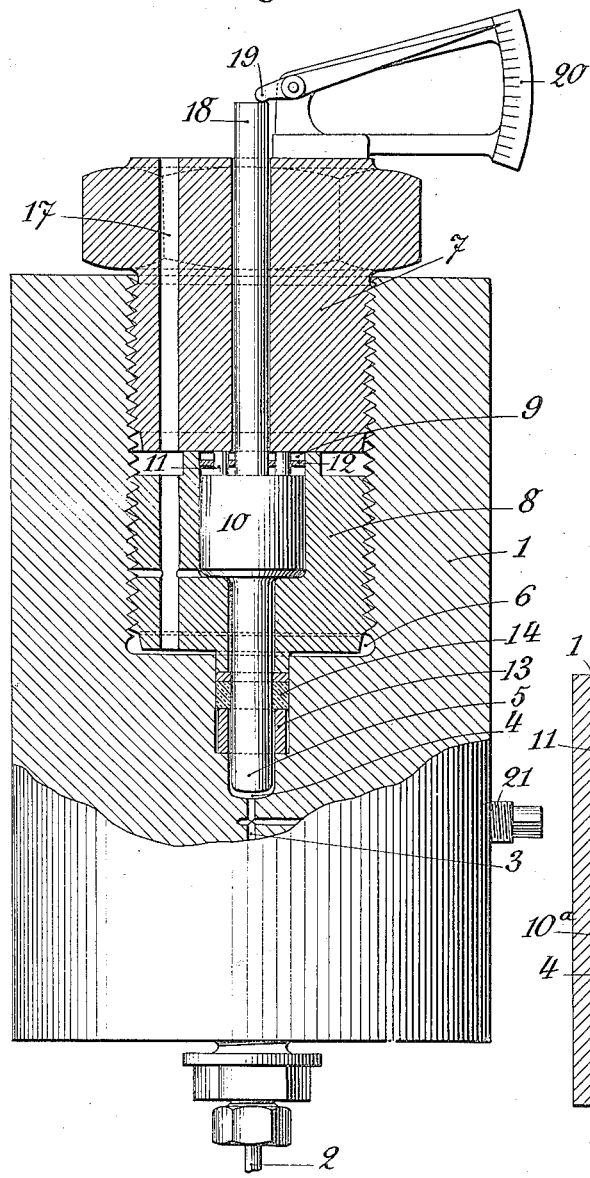
Figure 1 is an axial section.
Figure 2:
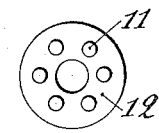
Figure 2 shows the disposition of the crushers upon a supporting member.

As shown in Fig. 1, a hard steel block 1 is provided with a neck 2 for the admission of fluid under pressure. This fluid passes through the duct 3 and enters a chamber 4 having movable therein a piston composed of two cylindrical parts 5 and 10 of different diameters. The block 1 is provided with the recess 6 having screwed therein the two threaded sleeves 7 and 8. The sleeve 8 contains the chamber 9 having movable therein the part 10. Between the part 10 and the sleeve or stopper 7 are disposed a plurality of crushers 11 of copper or like material, these being preferably maintained in position by a pasteboard washer 12 suitably apertured to receive the said crushers with a slight friction (Fig. 2).

Around the part 5 of the piston is disposed a packing member 14. The fluid may be discharged through a duct 17 provided in the two sleeves, for instance in case of leakage. The part 10 of the piston is provided with a lever 19 carrying a pointer adapted to move upon a dial 20 having scale divisions. At 21 is a screw needle valve for effecting the discharge into the air upon starting the apparatus.

For each measurement of pressure which is to be effected, the number of crushers is chosen in such manner that the load upon each shall be within the range in which the crushing strains to be measured shall correspond to the region of maximum precision for the use of the crushers.

Having disposed the crushers in the proper position upon the part 10 when at the bottom of the stroke, the sleeves 7 and 8 are screwed into the recess 6, whereupon the pressure to be measured is brought to bear within the chamber 4 and under the part 5 of the piston. The thrust acting upon the piston is entirely transmitted to the crushers, these being crushed to the corresponding degree. The displacement of the rod 18 secured to the part 10 with reference to the sleeve 8 secured to the block 1 and the sleeve 7 corresponds exactly to the crushing effect upon the crushers, and may be used for the exact measurement of this latter, for instance by the movement of the pointer 19 over the dial 20. Another method is to unscrew the sleeve 7 after the pressure has fallen, then removing the crushers and measuring the degree of crushing in a direct manner.

The part 5 of the piston may be given during the construction thereof as large a diameter as is required in order that no difficulty will be encountered in the construction of the packing member 14 surrounding the same. It will suffice to provide at the same time for the use of a considerable number of crushers. The device 19, 20, actuated by the extending portion 18 will permit of following in a continuous manner the variations of pressure as these take place. The amount of movement may be increased if required by the use of any suitable disposition. An advantage is afforded by the use of crushers in that each operation will now leave a visible record in the form of the test pieces, which may be called upon to furnish useful indications at a subsequent period. The apparatus may be used for the measurement of all high pressures which are caused to act upon the piston 5 through the medium of a compressible or non-compressible fluid.

Figure 3:
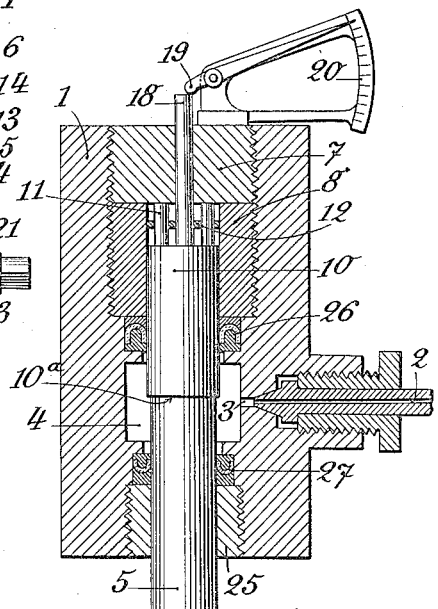
Figure 3 is an axial section of an apparatus adapted for immersion in the fluid pressure.

In Fig. 3, the piston is disposed within a block 1 and is slidable in the screwed sleeves 8 and 25. The packing members 26 and 27 provide for the proper tightness and prevent the escape of the fluid under pressure which enters the central chamber 4. The pressure of this fluid is exerted upon the annular surface $10^a$, thus effecting the displacement of the piston and producing a crushing action upon the crushers 11 disposed upon the surface of the cylinder 10. A rod 18 secured to the piston projects outwardly of the apparatus, and the movements thereof will indicate the various phases of the action taking place.

Claims:

1. An apparatus for the measurement, by means of crushers, of high pressures transmitted by a fluid, comprising a main body having a chamber therein said chamber comprising two communicating portions of different diameters, a piston having two portions of different diameters, each slidably fitting one portion of the chamber, fluid tight packings provided upon each one of these portions, interposed between the piston and the walls of the chamber, a conduit for admiting a fluid under pressure leading into the said chamber between these two packings, crushers disposed in said chamber upon the larger portion of the piston and at the end remote from the fluid conduit, means for retaining said crushers within the body and means connected with said piston for indicating at the exterior of the main body and on an enlarged scale the displacements of the piston concurrently with the crushing of said crushers.

2. An apparatus for the measurement of high pressures by means of crushers, comprising a piston having two parts of different diameters, a block having bored-out chambers formed therein for receiving respectively these parts, a removable plug screwed into one end of the said block opposite the said piston, there being a duct provided within the said block and opening into the chamber surrounding the most narrow part of the piston rod whereby the fluid whose pressure is to be measured is conducted therein, the space between the piston and the said removable plug being adapted to receive the crusher or crushers which are to be crushed at each measuring operation, the said plug having an aperture formed therein, a rod secured to the said piston and extending through the said aperture of the plug, and means exterior of said block adapted to be actuated by said rod for indicating on an enlarged scale the displacements of the said rod with reference to the said plug immediately upon the occurrence thereof.

3. An apparatus for the measurement of high pressures by means of crushers, comprising a piston having two parts of different diameters, a block having bored-out chambers formed therein adapted to respectively receive the said parts, a removable plug screwed into one end of the said block opposite the said piston, there being a duct formed in the said block and extending to the chamber surrounding the most narrow part of the piston whereby the fluid whose pressure is to be ascertained shall be conducted into the said chamber, a washer disposed loosely in the space between the piston and the said plug, the said washer having a plurality of apertures formed therein adapted to receive the crushers to be crushed, the said plug having an aperture formed therein, a rod secured to the piston and extending through the said aperture in the plug, and means exterior of said block adapted to be actuated by said rod for indicating on an enlarged scale the movements of the said rod with reference to the said plug contemporaneously with the production of the same.

In testimony, that I claim the foregoing as my invention I have signed my name in presence of a subscribing witness.

EMILE RIMAILHO.

Witness:
MARCEL COMPIN.